Dec. 24, 1968     E. G. NELSON     3,417,887
CHOKERLESS SKIDDER

Filed Jan. 30, 1967                               2 Sheets-Sheet 1

INVENTOR.
EDWARD G. NELSON

BY

ATTORNEY

INVENTOR.
EDWARD G. NELSON

United States Patent Office 3,417,887
Patented Dec. 24, 1968

3,417,887
CHOKERLESS SKIDDER
Edward G. Nelson, Atlanta, Ga., assignor to Deere & Company, Moline, Ill., a corporation of Delaware
Filed Jan. 30, 1967, Ser. No. 612,662
6 Claims. (Cl. 214—147)

ABSTRACT OF THE DISCLOSURE

An apparatus for skidding logs in which a rotary hydraulic crane having a grapple is mounted on a logging tractor, the tractor being provided with a hook that engages an eye on the grapple to relieve the structure of the rotary hydraulic crane of the stresses imposed by the logs when they are held by the grapple and skidded over the ground.

In certain areas it is customary when harvesting trees to convey the trunk of a felled tree to a central area for further work. This operation is generally called "skidding." It is generally customary when skidding to secure the trunk of the tree to a tractor by means of a cable which is carried on a winch on the tractor, the end of the cable being provided with chocke cables which are placed about the logs to be skidded. Choke skidding requires that the operator place the choke cables about each log and this is a somewhat time-consuming operation.

It has been proposed in the past to manufacture chockerless skidders. In one form of chokerless skidder, a hydraulic jaw is carried on the vehicle which engages the butt end of trees, the trees being placed into the hydraulic jaw by either a rotary crane mounted on the vehicle or by a rotary crane mounted on a separate vehicle. U.S. patents of this type are 3,074,447, 3,102,-562, 3,102,563, 3,221,908, 3,227,295, 3,008,731, and Canadian 715,344. This form of structure has the disadvantage that when the going becomes tough and the tractor loses traction, it is necessary to dump the load and drive the tractor to a place where it can secure better traction and then reload. This disadvantage is not present in skidders employing choke cables. Thus, in the conventional choke cable skidder, it is only necessary to unreel a sufficient amount of cable to permit the tractor to advance to firmer ground, this operation being called "free spooling." Once the tractor is on firm ground, the excess cable is winched in until the butt ends of the logs are closely adjacent the rear of the tractor. The tractor can then resume its normal skidding operation.

A second form of chokerless skidder employs a rotary hydraulic crane mounted on a tractor. The crane has a boom movable towards and away from the tractor, and a log grapple is mounted on the boom. To skid a log with this form of skidder, a log (or logs) is engaged by the grapple and the boom is then moved towards the tractor and is held in place by the various hydraulic devices which cause it to move. Once the boom is in position, the tractor is propelled forwardly, thereby skidding the log held within the grapple. This form of skidder has the disadvantage of requiring a crane structure of very high strength to take the stresses imposed upon it when skidding logs, thus unduly increasing the cost of the machine.

It is an object of this invention to provide a chockerless skidder which will overcome the disadvantages of the prior art chokerless skidders.

More particularly, it is an object of this invention to provide a chokerless skidder in which a crane is mounted on a tractor, the crane having a grapple at the end remote from the tractor which can engage the ends of the logs which are to be skidded, the tractor being provided with a hook that can engage an eye on the grapple so that, when the hook and eye are engaged, the crane structure is relieved of the stresses imposed when skidding.

These and other objects and advantages of this invention will be apparent to those skilled in the art after a consideration of the following detailed description, taken in conjunction with the accompanying drawings in which the preferred form of this invention is illustrated.

Figure 1:
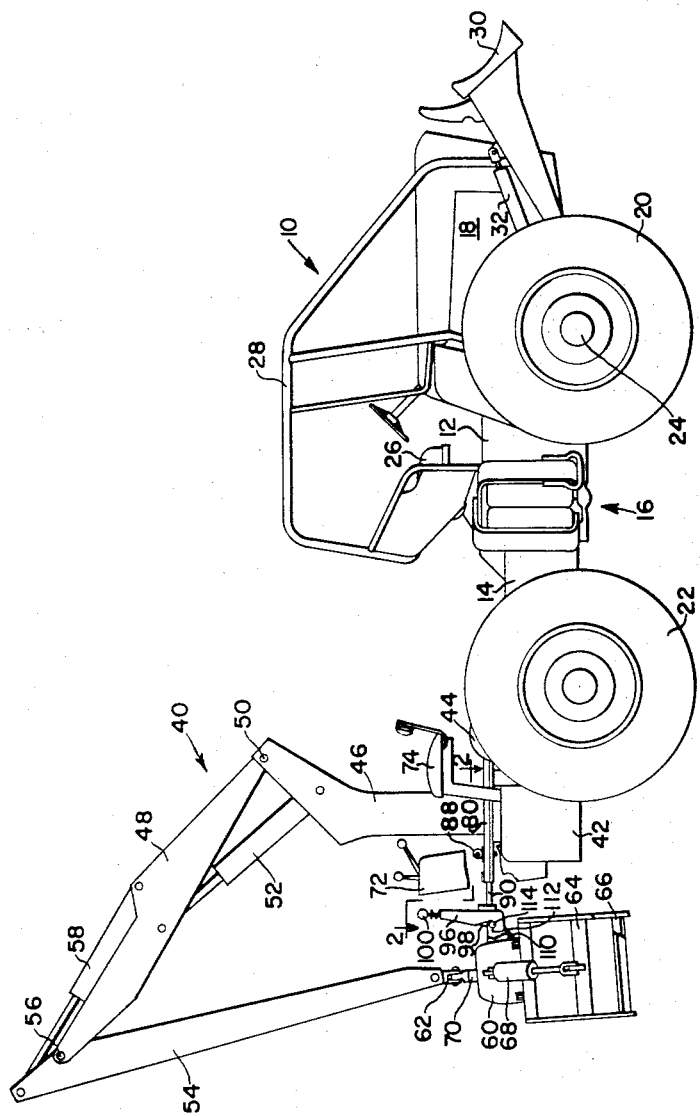
FIG. 1 is a side view of a logging tractor having a rotary hydraulic crane secured thereto, the tractor and crane incorporating the features of this invention.
Figure 3:
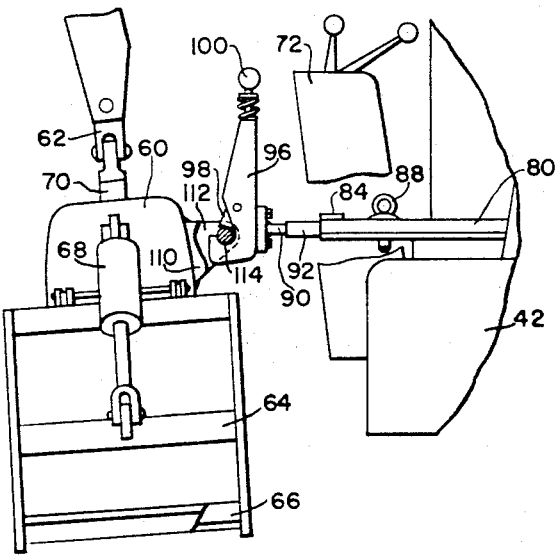
FIG. 3 is an enlarged view of the hook and eye connection between grapple and tractor.

The logging tractor, indicated generally at 10, has front and rear sections 12 and 14 which are secured for pivotal movement about a generally vertical axis at a center coupling indicated generally at 16. An engine is mounted with an engine compartment 18 and drives front and rear pairs of wheels 20, 22, the front axle 24 being mounted for swinging movement about a generally fore-and-aft extending axis. Mounted upon the front section 12 is an operator's station 26 from which the vehicle 10 may be controlled. As is conventional, the operator's station is provided with a seat canopy 28, and the vehicle may also be provided with a blade 30 that can be raised or lowered by hydraulic cylinders 32.

A rotary hydraulic crane, indicated generally at 40, is carried by the rear section 14 of the logging tractor 10. In this connection it should be noted that the base 42 of the canre 40 may be secured to the log bumper 44 normally found on a logging tractor. However, the particular manner in which the crane 40 is secured to the tractor is not material to the present invention. A mast 46 is mounted for rotation about a vertical axis on the base 42, and a first boom section 48 is secured to the upper end of the mast 46 by means of a horizontally disposed pivot 50. The boom section 48 can be raised and lowered by means of a hydraulic cylinder 52 which is pivotally secured at its ends to the mast and boom section 48. A second boom section 54 is secured to the first boom section 48 by means of horizontally disposed pivot 56. This boom section is also caused to be moved by means of a hydraulic cylinder 58 which is pivotally secured at its ends to the first and second boom sections. A hanger 60 is secured to the remote end of the second boom by means of a universal joint 62. A pair of log grapple clams 64, 66 are pivotally secured to the hanger 60 and are caused to be opened and closed by means of paired hydraulic cylinders 68. Means (not shown) are also provided for rotating the hanger 60 relative to the stub shaft 70 that extends downwardly from the universal joint 62. The various functions of the rotary hydraulic crane 40 are controlled from a control console 72 that is carried on the rear of the base 42 and to one side of the mast 46. For the convenience of the operator, a seat 74 is provided forwardly of the control console 72.

Figure 2:
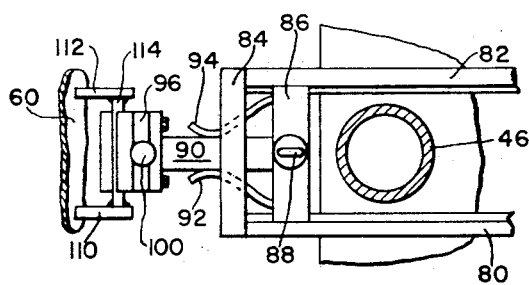
FIG. 2 is a section taken generally along the lines 2—2 in FIG. 1.

It is the feature of this invention that a hook is mounted on the tractor which may engage an eye provided on the hanger 60. To this end a pair of rails 80, 82 are rigidly secured to the rear section 14 of the tractor, the rails passing through apertures (not shown) in the upper end of the log bumper 44. As can be seen from FIG. 2, the rails 80 and 82 are disposed to either side of the mast 46. The rear ends of each of the rails 80, 82 are secured to each other by means of transversely extending straps 84, 86 which may be secured to the rails as by welding. The forward strap 86 is apertured and receives a pivot pin 88 which secures the forward end of a drawbar 90 to the tractor. Springs 92 and 94 are secured to the inner sides of the rails 80 and 82 and normally hold the drawbar in the centered position shown in FIG. 2. However, it should be noted that the drawbar 90 may swing to the left or right against the force of the springs 92, 94 if side forces are imposed upon it. Secured to the rear end of the drawbar 90 is a hook assembly 96 of the type more fully illustrated in U.S. Patent 3,231,294. As can be seen more clearly from the above-referred-to patent, the hook 96 is provided with a latch 98 that is manually controlled through control knob 100.

Secured to the forward side of the hanger 60 as by welding is a pair of forwardly extending plates 110, 112 which carry between their forward ends a transversely extending pin 114.

In operation, the operator of the logging tractor will drive it to the place where the trees have been felled. He will then park the vehicle and move to the control console 72 and, by operating the log grapple 64, 66, gather as many trees as the grapple will hold. Once the tree butts are firmly held within the grapple, he will then cause the eye 110, 112, 114 to be disposed within the hook 96. He will then cause the latch 98 to engage the eye by operation of the control knob 100, thus preventing the eye from becoming disengaged from the hook during the subsequent operations. Once the grapple is secured to the tractor, it is advisable to relieve the pressure in the hydraulic system of the rotary crane 40 to permit it to assume various positions as determined by the load being pulled. The operator of the tractor will then resume his seat 26 in the cab and drive the vehicle to the place where further work is to be done on the trees. It should be noted that if the vehicle should encounter a place where it cannot pull a load due to poor traction, the latch may be disengaged, permitting the eye to come out of the hook, and the tractor 10 can then be moved to a position where better traction is available, at which time the hydraulic crane 40 will then be repositioned to place the eye within the hook 96.

While the preferred structure in which the principles of the present invention have been incorporated is shown and described above, it is to be understood that the invention is not to be limited to the particular details, shown and described above, but that, in fact, widely different means may be employed in the practice of the broader aspects of the invention.

What is claimed is:

1. An apparatus for skidding logs including a logging tractor, a rotary hydraulic crane mounted on said tractor, and a grapple mounted on the outer end of said crane and movable between positions remote from said tractor to positions closely adjacent said tractor, the improvement which comprises: rearwardly extending hook means on said logging tractor, and eye means interconnected with said grapple and so disposed that it can engage said hook, said hook means including a drawbar, vertically disposed pivot means interconnecting the forward end of said drawbar with said tractor, spring means cooperable with the sides of said drawbar to normally hold the drawbar in a centered position but operable to permit side swinging, and a rearwardly facing hook secured to the rear end of said drawbar.

2. An apparatus for skidding logs including a logging tractor, a rotary hydraulic crane mounted on said tractor, and a grapple mounted on the outer end of said crane and movable between positions remote from said tractor to positions closely adjacent said tractor, the improvement which comprises: rearwardly extending hook means on said logging tractor, and eye means interconnected with said grapple and so disposed that it can engage said hook, said crane including a mast rotatable about a vertical axis, a first boom section pivotally secured to said mast about a horizontally extending axis, a second boom section pivotally secured to said first boom section about a horizontally extending axis, grapple means secured to said second boom section for articulated movement, said grapple means including a hanger and a pair of grapple clams pivotally secured to said hanger, said eye means including a pair of forwardly extending, spaced apart plates rigidly secured to said hanger and a transversely extending pin disposed between the forward ends of said plates.

3. An apparatus for skidding logs comprising: a logging tractor, a mast rotatably secured to said tractor, boom means movably secured at one end to said mast, grapple means including a hanger connected for articulated movement to the end of the boom means remote from said mast, and a pair of grapple clams pivotally secured to said hanger, eye means carried by said hanger, a drawbar, vertically disposed pivot means interconnecting the forward end of the drawbar with said tractor, spring means cooperable with the sides of the drawbar to normally hold the drawbar in a centered position but operable to permit side swinging, and a rearwardly facing hook secured to the rear end of said drawbar, said hook being provided with a latch operable to hold said eye means securely within said hook.

4. An apparatus for skidding logs comprising: a logging tractor, a log grapple, boom means normally interconnecting said grapple with said tractor for vertical movement of the grapple relative to the tractor and for movement of the grapple towards and away from the tractor, and connectible force transmitting means selectively interconnectible between the grapple and the tractor and operable when connected to transmit draft forces between the tractor and the grapple independently of the boom means.

5. The apparatus set forth in claim 4 in which said additional means comprises rearwardly extending hook means on said logging tractor, and eye means interconnected with said grapple and so disposed that it can engage said hook.

6. The apparatus set forth in claim 5 in which said hook is provided with a latch whereby said eye means may be held securely within said hook.

References Cited

UNITED STATES PATENTS 792,796   6/1905   Searfoss _____ 212—42.5

HUGO O. SCHULZ, *Primary Examiner.*

U.S. Cl. X.R.

214—138